United States Patent [19]

Ptacnik et al.

[11] 4,211,899
[45] Jul. 8, 1980

[54] CIRCUIT ARRANGEMENT FOR AN INDIRECTLY CONTROLLED EXCHANGE, IN PARTICULAR A TELEPHONE EXCHANGE

[75] Inventors: Edmund Ptacnik, Soecking; Carl Trainer, Argelsried, both of Fed. Rep. of Germany

[73] Assignee: Siemens Aktiengesellschaft, Berlin & Munich, Fed. Rep. of Germany

[21] Appl. No.: 916,290

[22] Filed: Jun. 16, 1978

[30] Foreign Application Priority Data

Jul. 27, 1977 [DE] Fed. Rep. of Germany ....... 2733921

[51] Int. Cl.² .............................................. H04Q 1/22
[52] U.S. Cl. .............................. 179/175.2 C; 364/200
[58] Field of Search ................ 179/175.2 R, 175.2 C, 179/15 BF, 18 EB, 18 ES; 364/200; 340/146.1 R

[56] References Cited

U.S. PATENT DOCUMENTS

| 3,908,099 | 9/1975 | Borbas et al. ................ 179/175.2 R |
| 3,912,881 | 10/1975 | Rigazio et al. ................ 179/175.2 R |

Primary Examiner—James W. Moffitt
Assistant Examiner—Joseph A. Popek

Attorney, Agent, or Firm—Hill, Van Santen, Steadman, Chiara & Simpson

[57] ABSTRACT

A circuit arrangement for an indirectly controlled exchange, in particular a telephone exchange, is provided with central control devices and, on the occurrence of a fault signal, for the retention of the operating states currently prevailing in the exchange, items of test data concerning the electrical states at specific test points are input into a memory, for which purpose the operating state prevailing in the exchange is temporarily maintained. The circuit arrangement includes two parallel operating control devices, each of which has a data bus and is additionally equipped with a status memory which serves to accommodate test data. The status memory includes an input which is connected to the respective data bus and an output which is connected to the data bus of the other control device. Each status memory is connected to at least one device which supplies fault signals and also to terminals which supply control signals of the control devices. As a result of a control signal which follows a fault signal the entire test data contained in the two status memories is transferred into two working memories of the two control devices. In each of the two control devices test data corresponding to one another are compared and the test data, together with the comparison results are fed, for further analysis, from each control device to its output device.

11 Claims, 1 Drawing Figure

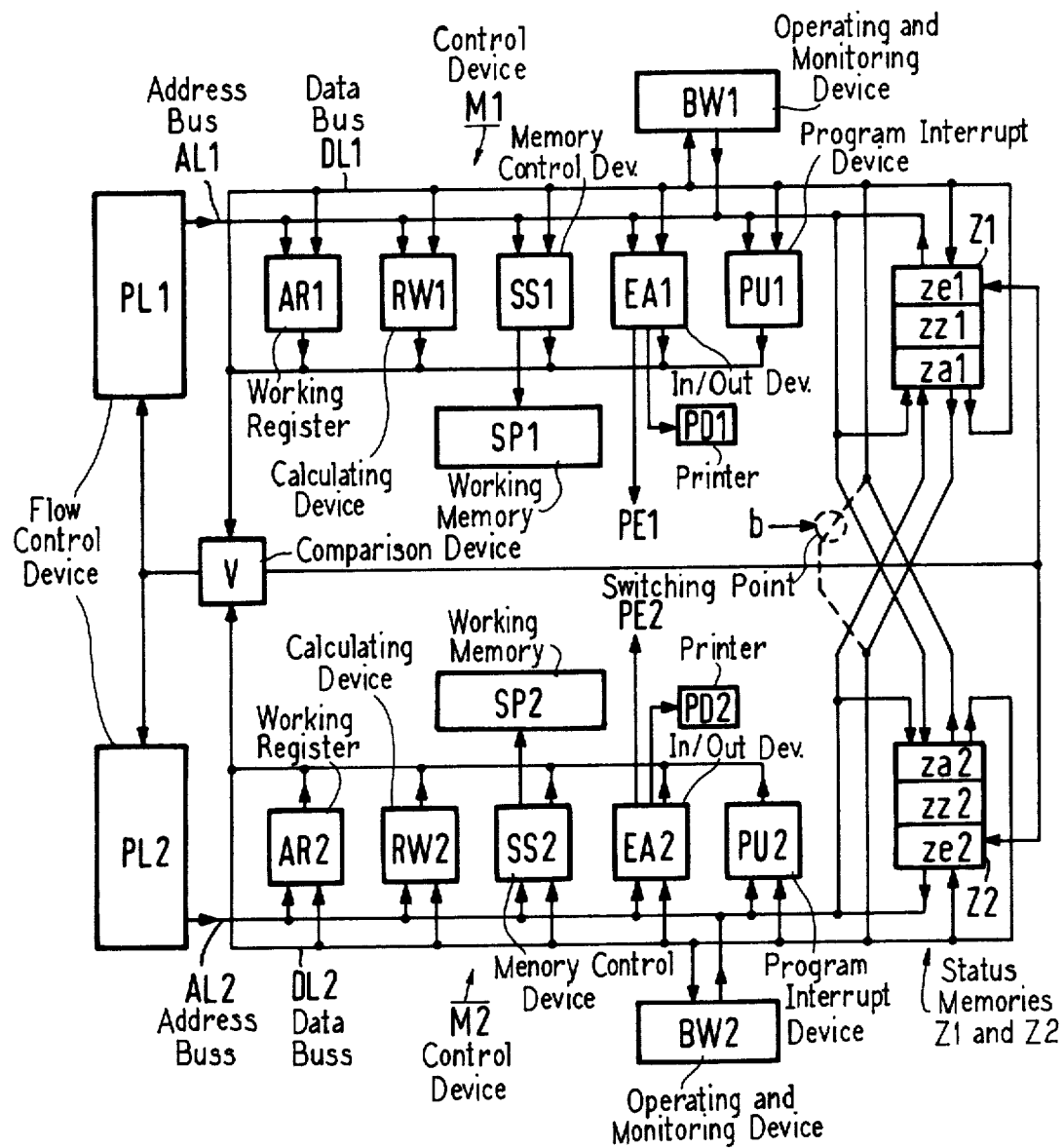

CIRCUIT ARRANGEMENT FOR AN INDIRECTLY CONTROLLED EXCHANGE, IN PARTICULAR A TELEPHONE EXCHANGE

BACKGROUND OF THE INVENTION

1. Field of the Invention

The present invention relates to indirectly controlled exchanges, and more particularly to circuit arrangements for such exchanges in which fault signals are generated and the operating status of the test points in the exchange are determined, stored and processed with the test data for analysis by output apparatus.

2. Description of the Prior Art

As is known, control devices of exchanges, in particular telephone exchanges, are subject to particularly high requirements. The exchanges are indirectly controlled exchanges which have central control devices which must handle the switching operation and other, more extensive, processes. In modern exchanges, central control devices of this type have various sub-devices, e.g. working registers, calculators, a memory in which program commands are stored and which can also serve as a working memory. A particularly high requirement to which such exchanges are subject resides in the fact that associated control devices must carry out a real-time operation which, as far as possible, must not be impermissibly disturbed by interruptions due to reported faults. Therefore, in control devices of this kind it is necessary to take measures for rapid determination of faults in order that such faults may be eliminated.

Various methods are already known in the art for establishing faults in control devices of this kind. Of particular interest is a circuit arrangement in which, in the case of a fault, test data are stored. In this connection, one may refer to the German Pat. No. 1,108,747. This circuit arrangement is also provided for an indirectly controlled exchange, in particular a telephone exchange. This exchange also has central devices. On the occurrence of a fault signal, the operating states prevailing in the exchange are stored by means of test data. The test data indicate the electrical states prevailing at specific test points and are input into a memory, for which purpose the operating state prevailing in the exchange is temporarily stored. Test data of this kind can, on the one hand, be extremely extensive, and, on the other hand, can indicate very special electrical states which, if at all, can only be checked for accuracy and reliability with a high expense. Particular difficulties occur if the test data has been produced by a sporadic fault. In such a case, it is not possible to localize the fault with the aid of a test program, as it is not likely that it will occur during the course of the test program.

SUMMARY OF THE INVENTION

The object of the present invention is to provide, with a viable expense, a structure by which it is possible to obtain and analyze test data in order to discover fault sources and to localize faults, in particular to discover and localize sporadic faults.

The present invention is based on the aforementioned circuit arrangement for an indirectly-controlled exchange, in particular a telephone exchange, which has central control devices and wherein, upon the occurrence of a fault signal the operating state prevailing in the exchange is temporarily maintained and the electrical states prevailing at specific test points are input into a status memory in order to retain the operating states.

The circuit arrangement constructed in accordance with the present invention is particularly characterized in that each of two control devices which operate in parallel and are each provided with a data bus is additionally equipped with a status memory which serves to accommodate items of test data, and whose input is connected to its own data bus and whose output is connected to the data bus belonging to the particular other control device. Each status memory is connected to the device which supplies fault signals and to those terminals of the control devices which supply control signals. As a result of a control signal which follows a fault signal the entire test data contained in the two status memories is transferred into two working memories of the two control devices. In each of the two control devices items of data corresponding to one another are compared, and the test data and the comparison results are fed from each control device to its output device for further analysis.

The circuit arrangement constructed in accordance with the invention can be used to obtain test data and the comparison results as a print-out from the aforementioned output devices. Generally speaking, as a fault will have occurred only in one of the two control devices, a set of correct test data and a set of test data indicating items of incorrect information will therefore be obtained. The comparison results directly indicate the points at which incorrect test data are located. This is of significance as the number of such items of test data can be very great, and can comprise, for example, several hundred bits. The items of test data which are supplied with the aid of this circuit arrangement and have already been prepared can be analyzed by means of further measures in order to discover the fault source or the cause of the fault. This is facilitated by the fact that a set of correct test data is also available. Sporadic faults can be included in the analysis as it is unnecessary to subsequently run a test program in the control devices which can remain fruitless, in fact when the fault occurs only sporadically. If, in this respect, reproduction experiments were carried out for the fault it would be likely that the number of such experiments would be very high in the case of sporadic faults. It would also be necessary to provide that the test program be capable of allowing a sporadic fault produced by a different program to reoccur. Advantageously, in contrast the circuit arrangement constructed in accordance with the present invention supplies from the start test data suitable for discovering a sporadic fault. These items of test data are in fact supplied immediately on the occurrence of the sporadic fault and can be printed out.

The transfer of test data into the two control devices, on the other hand, cannot take place until later, following the occurrence of the sporadic fault. This is advantageously effected when it is possible to interrupt the parallel operation of the control devices without obstructing later cooperation. This transfer of test data can be effected with the aid of control signals which are supplied by flow control devices connected to the parallel-operating control devices and which are connected to the device which supplies the fault signals. The fault signals themselves can be produced by means of various processes in the control devices, as will be explained hereinbelow.

BRIEF DESCRIPTION OF THE DRAWING

Other objects, features and advantages of the invention, its organization, construction and mode of operation will be best understood from the following detailed description, taken in conjunction with the accompanying drawing, on which there is a single FIGURE which is a schematic block diagram of an exemplary embodiment of a circuit arrangement constructed in accordance with the invention and comprising two control devices.

DESCRIPTION OF THE PREFERRED EMBODIMENT

Referring to the drawing, two control devices M1 and M2 are similarly classified into various sub-devices. For example, the control device M1 comprises, in addition to a flow control device PL1, further sub-devices such as a calculating unit RW1 in which data are processed, a working register AR1 which also includes operand registers, and an operating and monitoring device BW1. Additionally, the control device M1 comprises a memory control device SS1 which controls the memory SP1, the latter accommodating program commands and also variable data as a working memory. A further component of the control device M1 is an input/output device EA1 which has access to peripheral devices PE1 including, for example, setting-up devices for the switching network of the exchange, and other devices. It also has access, in particular, to an output device PD1 which can also be set up as a printer for test data. Finally, a further component is a program interruption device PU1. All of these devices can exchange data with one another by way of the data bus DL1. The exchange of such data can here also be controlled by way of an address bus AL1 by way of which addresses suitable for this purpose are fed from the flow control device PL1 to the relevant sub-devices. The sub-devices belonging to the control device M2 are provided with references corresponding to those of the control device M1; however, these references have been provided with the index 2 instead of the index 1.

As already stated above, each of the two parallel-operating control devices M1 and M2 is additionally equipped with a status memory which serves to accommodate test data. The control device M1 is provided with the status memory Z1 which is equipped with an input control device ze1 and with an output control device za1. The control portion of the status memory Z1 is referenced zz1. The input control device ze1 is connected to the data bus DL1 and to the address bus AL1 of the control device M1. The output control device za1 is likewise connected to these buses. It is also connected to the two buses DL2 and AL2 of the control device M2. This enables items of test data received by the status memory Z1 to be transmitted both to its own control device M1 and to the other control device M2. By means of the input control device ze1, employing addresses of sub-control devices of the control device M1, test data of this kind is previously collected from all the consecutively addressed sub-control devices. Addresses which arrive by way of the address buses AL1 and AL2 in the output control device za1 can then later be used to cause input items of test data to be transferred via the data buses DL1 and DL2 into the working memories SP1 and SP2 of the control devices M1 and M2. These addresses can be supplied by the flow control devices PL1 and PL2 at the suitable times. The control device M2 is provided with the status memory Z2 which includes an input control device ze2, an output control device za2 and the storage component zz2. The input control device ze2 and the output control device za2 are connected, in the same way as the status memory Z1, to the buses AL1, DL1, AL2 and DL2 so that items of test data can also be transferred from this status memory to the working memories SP1 and SP2 of the two control devices M1 and M2.

Items of test data of this kind are input into the status memories when the device V which supplied fault signals has, in fact, supplied a fault signal. In the exemplary embodiment illustrated, the device V which supplies fault signals comprises a comparator having inputs connected to the data buses DL1 and DL2, and which is also connected to the flow control devices PL1 and PL2 and to the status memories Z1 and Z2. Fault signals supplied by the comparator device V pass to the input control devices ze1 and ze2 of the status memories Z1 and Z2 from where they cause the test data of various sub-devices of the control devices M1 and M2 to be collected with the aid of addresses. In the comparator device V, in a manner well know in the art, for example see the German Pat. No. 1,965,314, items of data are compared which have been processed by the control devices and which are transmitted by way of the associated data buses DL1 and DL2. By way of the links between the comparator device V and the flow control devices PL1 and PL2, fault signals also pass to the flow control devices and can cause the operating state prevailing in the exchange to be temporarily retained. At a suitable later point of time, the flow control devices PL1 and PL2 then each supply control signals which cause the output control devices za1 and za2 to transfer previously input test data to the working memories SP1 and SP2. A control signal of this kind for the transfer of test data is supplied when it is possible to interrupt the parallel operation of the control devices M1 and M2 without obstructing later operation. Such a time occurs, for example, when the flow of a machine command, which has been broken by a fault signal, is terminated. The handling of a machine command requires, in fact, the run through of a greater or lesser number of microcommands. This produces intermediate states in the control devices about which information is not normally intermediately stored so that in the event of the insertion of other processes in the event of an interruption it would not be readily possible to allow the control devices to cooperate again at a later point of time without the occurrence of undesired modifications in the operating flow. On the other hand, at the end of a machine command, where necessary, the state reached in a control device is retained in a regular manner by means of intermediate storage so that other processes can be inserted.

The manner in which the operation for detecting sporadic faults occurs in the exemplary embodiment will now be described. During the operation, items of prepared data must be transferred between the various sub-devices of one and the same control device. Therefore, for example, data prepared in the calculating unit RW1 of the control device M1 must be transferred via the data bus DL1 to the working registers AR1. Operating results corresponding to one another occur simultaneously on the data buses DL1 and DL2 because of the parallel operation of the two control devices M1 and M2. In the event of a deviation between such data, the comparator device V supplies a fault signal. However, not all the states occurring in the control devices at the test points and the associated data are covered. These are covered only when, due to the fault signal, the operating state is temporarily retained and, as a result of the control signal the input control devices ze1 and ze2 interrogate all these items of test data with the aid of addresses and input the data into the storage components zz1 and zz2 of the status memories Z1 and Z2. The control signal which follows the fault signal at a suitable time then causes the entire test data contained therein to be transferred into the working memories SP1 and SP2. Therefore, the working memory SP1 receives the test data obtained for the control device M1 and for the control device M2. All these items of test data are also fed to the working memory SP2. In each of the two control devices, the items of test data corresponding to one another are then compared, which can be carried out in a manner which is known per se, as exemplified, for example, in the German Published Application No. 1,524,239, the German Allowed Application No. 1,280,593, and the German Pat. No. 2,104,298. As a result of this technique, devices for comparing the test data, which as a rule is not extensive, can advantageously be avoided in the status memories Z1 and Z2. Finally, the test data, together with the comparison results, are then fed for further analysis to the output devices PD1 and PD2 where they are expediently printed out.

In the exemplary embodiment illustrated on the drawing, the device which supplies the fault signals comprises a comparator device. However, in the circuit arrangement constructed in accordance with the invention, utilizable fault signals could also be supplied by at least one parity check device. Parity check devices of this kind check the data occurring in one of, or both of, the control devices. Suitable fault signals can also be supplied by a time measuring device which monitors the flow of time-limited processes in a control device and supplies fault signals when these processes impermissibly delay one another. It is expedient to set up devices supplying fault signals of this kind in both control devices. A comparator device can also be provided in each control device. The supplied fault signals then exert a combined influence upon the flow control devices and upon the status memories.

Control devices in which the handling of operating processes is achieved with the aid of machine commands can also be designed in such a manner that the particular associated flow control device for this purpose simultaneously runs through machine commands, the execution of which requires the use of various sub-devices. For example, it can be a question of the need to simultaneously employ the associated calculating unit and to input data into the working memory. However, it can also be a question of employing different components of the calculating unit. With an operating mode of this kind, obviously much operating time is saved. However, generally speaking, the machine commands which are present cannot always be handled simultaneously. Advantageously, in association with the circuit arrangement constructed in accordance with the invention, in the absence of a second machine command which could be handled simultaneously, instead a test command is run through which results in the transfer and analysis of the test data contained in the status memories if such a process is waiting to be carried out. When this technique is employed, in the detection and analysis of test data, any noticeable delay in the operation of the control devices is avoided, which is particularly advantageous when these devices are operating in realtime operation as is normally the case in exchanges. Test commands of this kind can also serve to determine the source of the data which are to be compared by the comparator device V in order to supply the fault signal. These test commands can also be input with the aid of the operating and monitoring devices BW1 and BW2.

With the cooperation of the status memories Z1 and Z2, which here act as intermediate memories, data can be transmitted between the data buses DL1 and DL2. The two data buses DL1 and DL2 can also be directly connected by way of a controllable switching point. Then, data can also be directly transferred from one of the two control devices to the other. In the exemplary embodiment illustrated on the drawing, the switching position b which can be controlled, for example, by the flow control device PL1, is provided for this purpose. Then, employing a machine command for test purposes, by employing this switching position for example in the control device M1, the data which occur during the handling of another machine command in the two control devices M1 and M2 and which correspond to one another can be compared in order to discover faults. In this connection, one may also refer to the German Published Application No. 2,241,719. Items of register data can be compared, for example. This technique can be employed to detect arbitrary faults occurring in the control devices. If deviations occur in data compared with one another, these items of data can also be printed out in the above-described manner. If the fault is of a constantly occurring nature, by repeating the operating processes in question it is possible, for example, to print out the data occurring directly preceding the faulty data which then contributes toward simplifying the fault diagnosis.

Although we have described our invention by referring to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A circuit arrangement for an indirectly-controlled exchange, in particular a telephone exchange, which is provided with central control devices and in which, upon the occurrence of a fault signal, the operating status of the exchange is temporarily maintained and items of data concerning the electrical states prevailing at test points are input into a memory in order to retain the currently prevailing operating states, comprising
first and second parallel-operating control devices, said control devices including
first and second working memories, respectively,
first and second data buses, respectively,
first and second status memories, respectively, each including an input connected to its respective data bus and an output connected to the opposite respective data bus,
at least one fault device operable to supply fault signals connected to each of said data buses,
first and second terminals for receiving control signals connected to said data buses,
transfer means operable in response to a control signal which follows a fault signal to transfer the test data stored in said status memories into said working memories, first and second output devices, and comparison means for comparing the test data of the two control devices and feeding the test data and the comparison results to said output device.

2. The circuit arrangement of claim 1, wherein said first and second control devices comprise:

first and second flow control devices, respectively, connected to said fault device and to said transfer means and operable to provide a control signal to cause the transfer of data.

3. The circuit arrangement of claim 2, wherein:

said fault device comprises a comparator including inputs connected to said first and second data buses and outputs connected to said flow control devices and to said status memories.

4. The circuit arrangement of claim 1, comprising:

means for supplying a control signal after an interruption of the processing of a machine command by a fault signal.

5. The circuit arrangement of claim 1, wherein:

said first and second output devices each comprise data printers.

6. The circuit arrangement of claim 1, comprising:

at least one parity checking device as said fault device for checking the data occurring in a control device.

7. The circuit arrangement of claim 1, wherein:

said fault device comprises a time-measuring device for monitoring the flow of time-limited processes and operable to provide a fault signal in response to an impermissible delay of one process by another.

8. The circuit arrangement of claim 1, comprising:

first and second flow control devices respectively in said first and second control devices connected to said fault device and to said transfer means and operable to provide a control signal to cause the transfer of data, said flow control devices also operable to handle machine commands the execution of which must be handled by the various components of the control devices, and including test command means operable in response to a first machine command and in the absence of a second machine command to carry out a test command to cause the transfer of data from said status memories to said working memories.

9. The circuit arrangement of claim 8, wherein:

said test command means includes means for producing a test command which identifies the data to be compared by said fault device.

10. The circuit arrangement of claim 8, comprising:

switching means operated by one of said flow control devices to interconnect said first and second data buses so that items of data which correspond to each other and which occur during handling of a machine command may be compared in order to discover faults.

11. The circuit arrangement of claim 8, wherein:

each of said control devices comprises a plurality of control sub-devices connected to the respective data bus, and a respective address bus connecting the respective control sub-devices and status memory to the respective flow control device, and each of said status memories comprises an input control device connected to its respective data and address buses, and an output control device connected to each of the mentioned address and data buses, said flow control devices supplying addresses to consecutively access said control sub-devices and input data therefrom into said status memories via said input control devices and to output data via said output control devices and input the same, via said data buses, into said working memories.

* * * * *